(12) United States Patent
Marchbanks

(10) Patent No.: US 12,056,550 B2
(45) Date of Patent: Aug. 6, 2024

(54) ADDITIVE MANUFACTURED SUBSTRATES WITH 3D READABLE CODES

(71) Applicant: Endeavor 3D, Douglasville, GA (US)

(72) Inventor: Luke Timothy Marchbanks, Douglasville, GA (US)

(73) Assignee: Endeavor 3D, Douglasville, GA (US)

( * ) Notice: Subject to any disclaimer, the term of this patent is extended or adjusted under 35 U.S.C. 154(b) by 7 days.

(21) Appl. No.: 18/102,353

(22) Filed: Jan. 27, 2023

(65) Prior Publication Data

US 2023/0244895 A1     Aug. 3, 2023

Related U.S. Application Data

(60) Provisional application No. 63/304,035, filed on Jan. 28, 2022.

(51) Int. Cl.
| | |
|---|---|
| *G06K 19/06* | (2006.01) |
| *B22F 10/10* | (2021.01) |
| *B33Y 70/10* | (2020.01) |
| *B33Y 80/00* | (2015.01) |

(52) U.S. Cl.
CPC ........ *G06K 19/06121* (2013.01); *B22F 10/10* (2021.01); *G06K 19/06037* (2013.01); *B33Y 70/10* (2020.01); *B33Y 80/00* (2014.12)

(58) Field of Classification Search
CPC ....... G06K 19/06121; G06K 19/06037; G06K 19/00; G06K 19/04; G06K 19/06; G06K 19/063; G06Q 20/34; G06Q 20/341; B22F 10/10
USPC ....................................... 235/489, 487, 380
See application file for complete search history.

(56) References Cited

FOREIGN PATENT DOCUMENTS

CH             663677 A5 * 12/1987 ............. G06K 19/02

* cited by examiner

*Primary Examiner* — Edwyn Labaze
(74) *Attorney, Agent, or Firm* — Meunier Carlin & Curfman LLC

(57) ABSTRACT

Various implementations include an optically readable coded device. The device includes a body having a first surface and a second surface opposite and spaced apart from the first surface, wherein the second surface defines a cavity. The cavity has a cavity interior surface spaced apart from the second surface. The first surface defines one or more code openings extending from the first surface to the cavity interior surface and in fluid communication with the cavity. The cavity has a cavity cross-sectional area in a plane parallel to the first surface, and the code openings have a code opening total cross-sectional area at the intersection of each code opening and the cavity interior surface. The cavity cross-sectional area is larger than the code opening total cross-sectional area. The code openings define an optically readable code on the first surface.

20 Claims, 15 Drawing Sheets

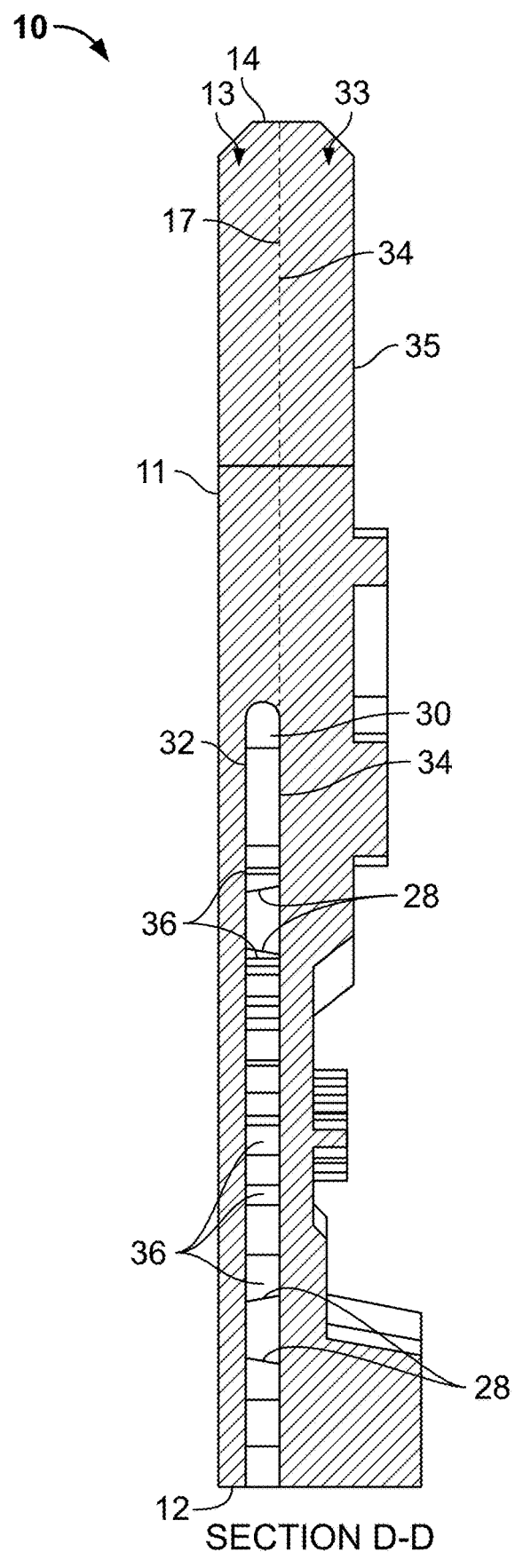
SECTION D-D FIG. 3

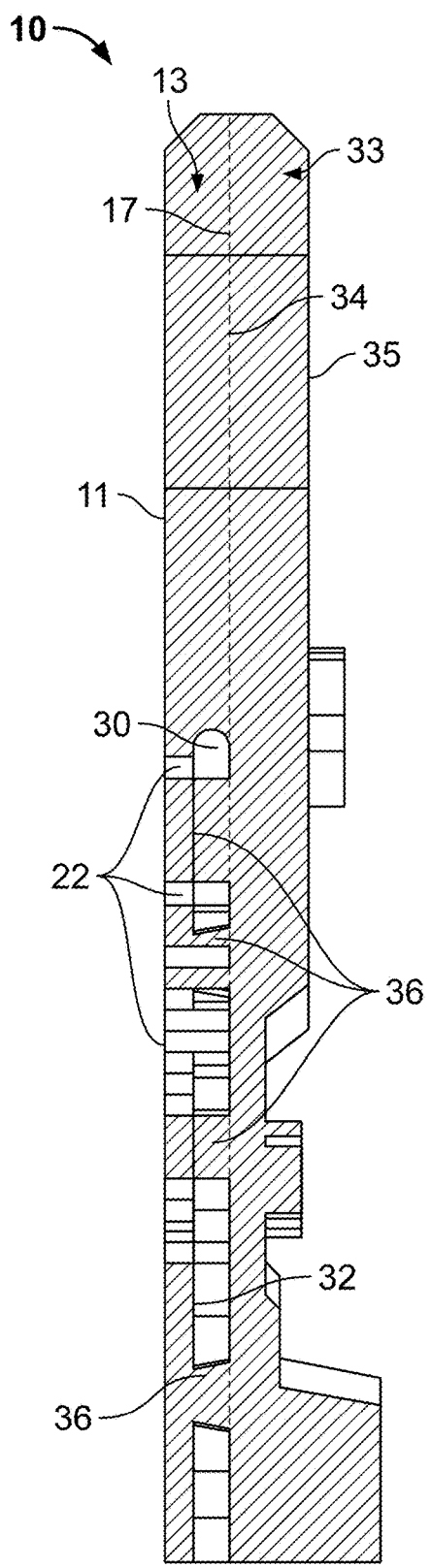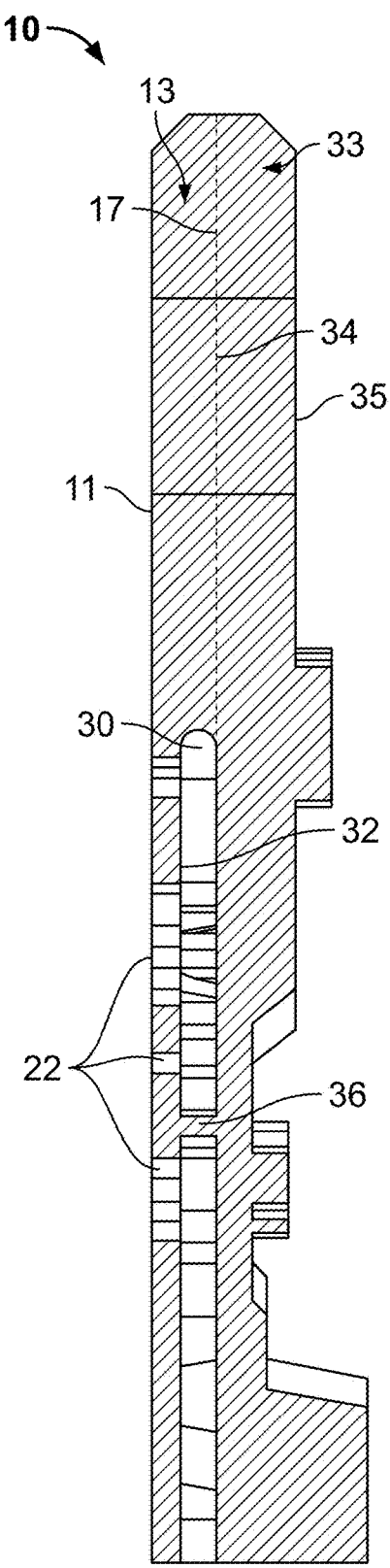
SECTION E-E  FIG. 4
SECTION F-F  FIG. 5

SECTION G-G  SECTION H-H  SECTION I-I

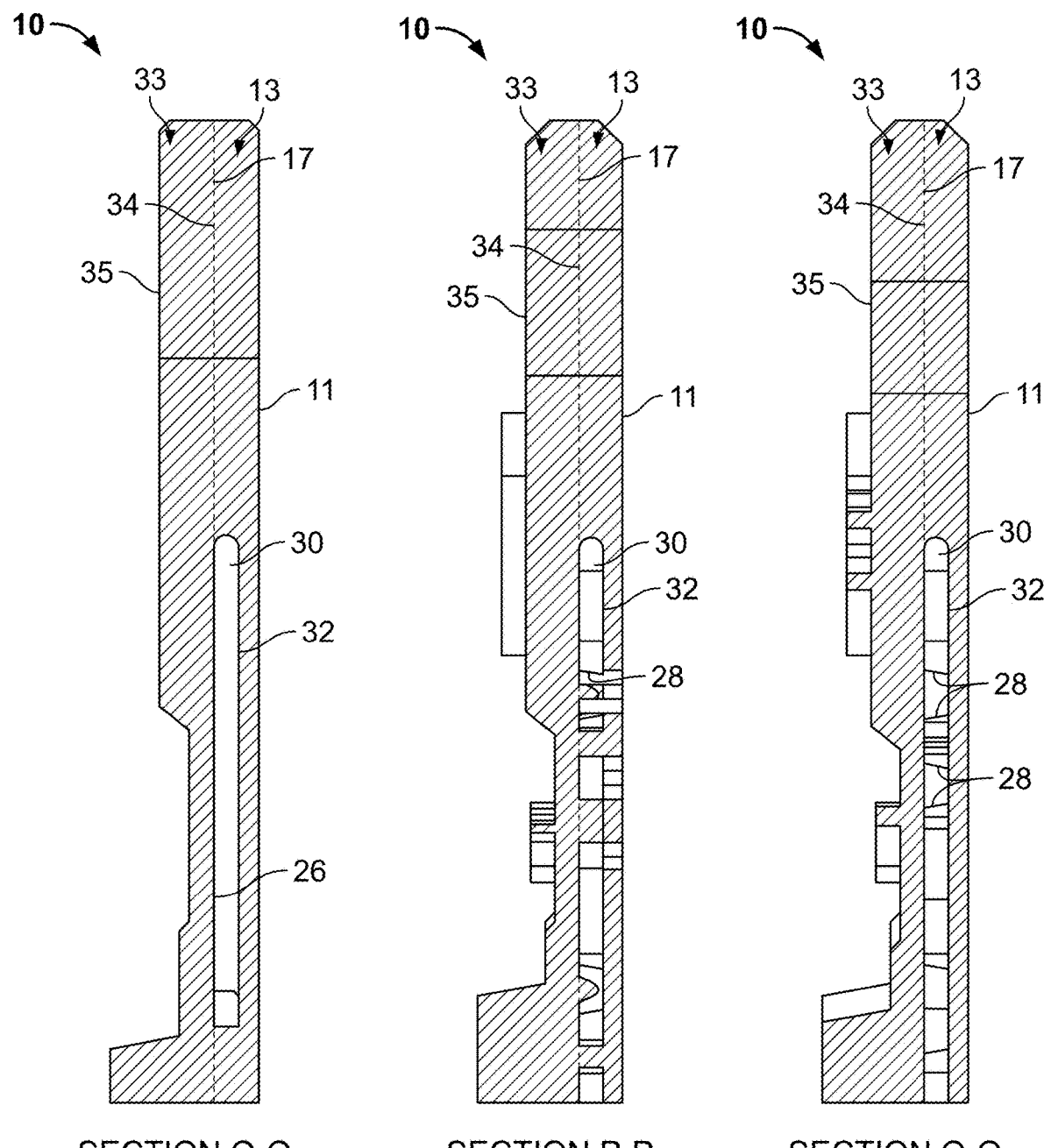

SECTION M-M

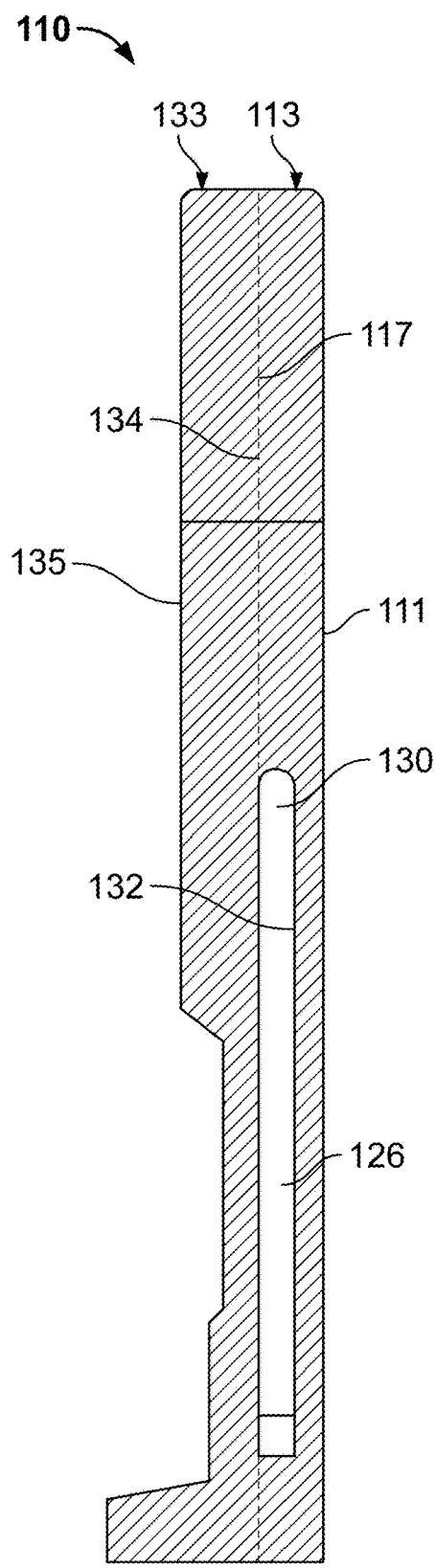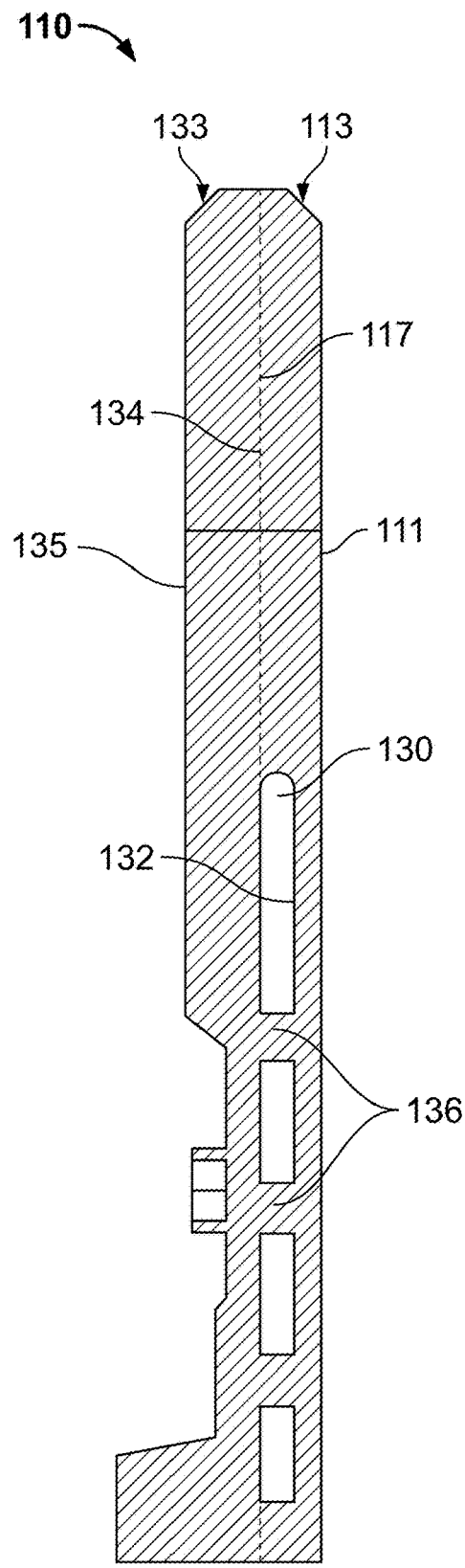
SECTION R-R
FIG. 18
SECTION S-S
FIG. 19

SECTION T-T

SECTION U-U

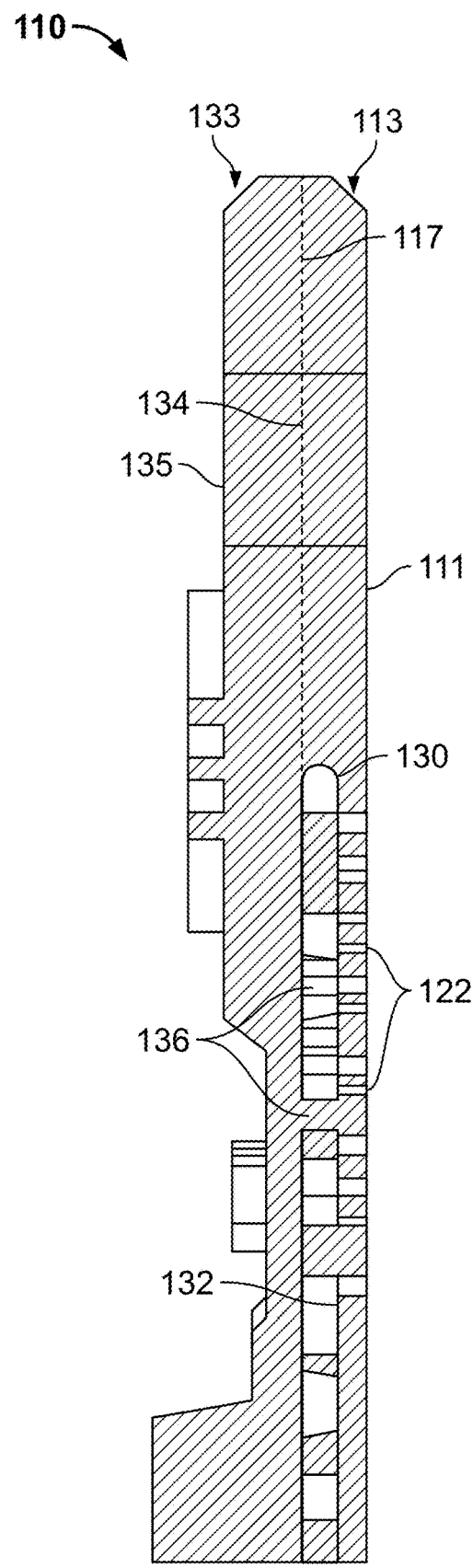
SECTION V-V  FIG. 22

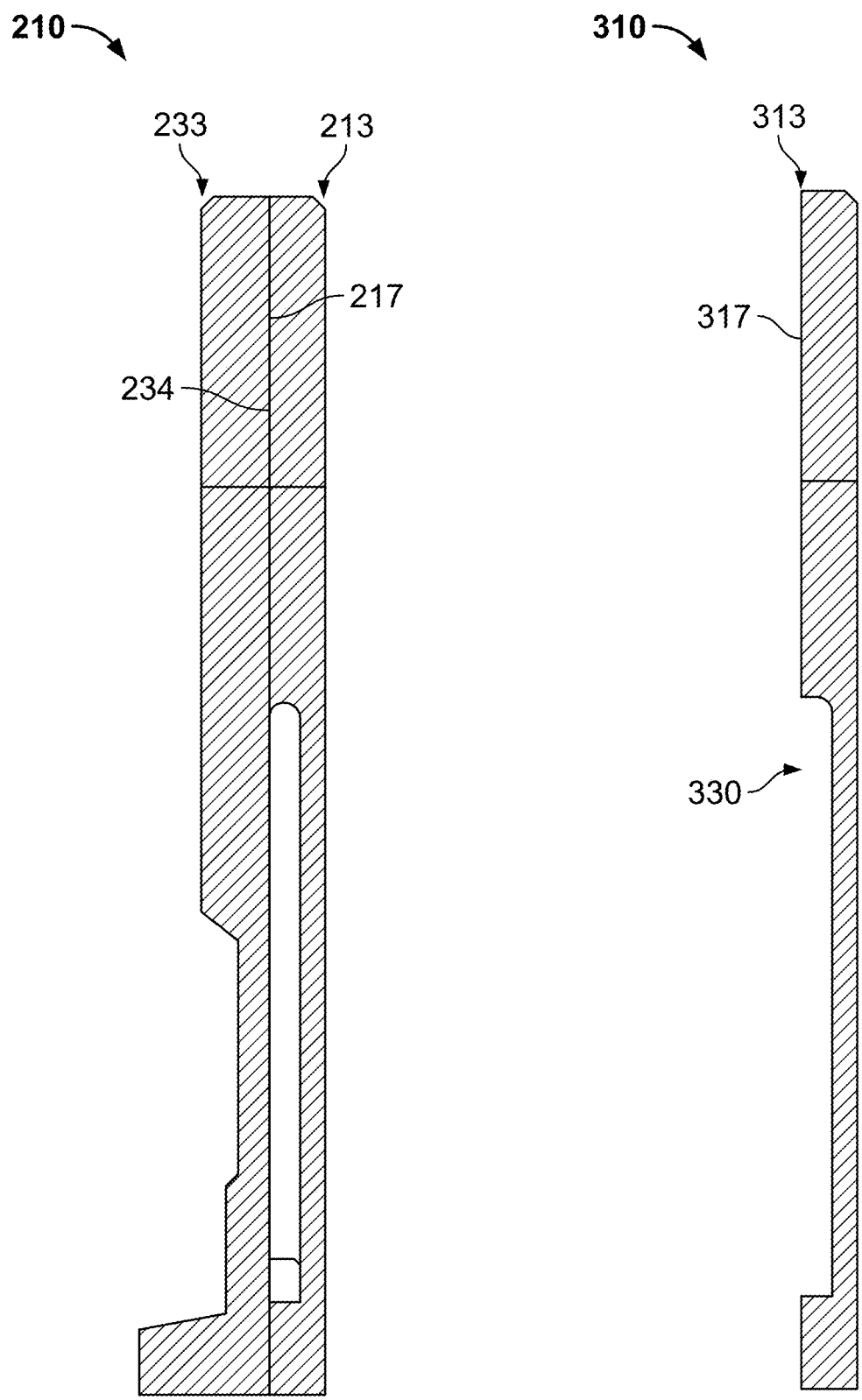

ADDITIVE MANUFACTURED SUBSTRATES WITH 3D READABLE CODES

BACKGROUND

Various optically readable codes, such as quick response (QR) codes and bar codes, are used to retrieve stored information. Software may be used by a reader to read these codes by identifying the parameters of the code relative to the code's background and retrieving information associated with the code. However, to optically read the code, the reader must be able to determine a contrast between the code and the background of the code.

SUMMARY

Various aspects of the present disclosure relate to an optically readable coded device. Some aspects relate to additive manufacturing of substrates with three-dimensional optically readable codes. Some aspects relate to additive manufacture of optically readable coded devices.

In some aspects, in the addition or in the alternative, the device includes a body having a first surface and a second surface opposite and spaced apart from the first surface, wherein the second surface defines a cavity. The cavity has a cavity interior surface spaced apart from the second surface. The first surface defines one or more code openings extending from the first surface to the cavity interior surface and in fluid communication with the cavity. The cavity has a cavity cross-sectional area in a plane parallel to the first surface, and the code openings have a code opening total cross-sectional area at the intersection of each code opening and the cavity interior surface. The cavity cross-sectional area is larger than the code opening total cross-sectional area. The code openings define an optically readable code on the first surface.

In some aspects, in the addition or in the alternative, the device further includes an adhesive layer disposed on at least a portion of the second surface.

In some aspects, in the addition or in the alternative, the body is a first body portion, and the device further includes a second body portion having a first surface and a second surface opposite and spaced apart from the first surface. In some implementations, the second surface of the first body portion is coupled to the first surface of the second body portion such that the first surface of the second body portion partially defines the cavity. In some implementations, the first body portion and the second body portion are monolithically formed. In some implementations, the device further includes an adhesive layer disposed on at least a portion of the first surface of the second body portion. In some implementations, the first surface of the second body portion is the same color as the first surface of the first body portion.

In some aspects, in the addition or in the alternative, the readable code comprises a quick response (QR) code. In some implementations, the readable code comprises a bar code. In some implementations, the readable code comprises readable information relating to identification of the device.

In some aspects, in the addition or in the alternative, the depth of the cavity, as measured between the cavity interior surface to the second surface, the depth of the cavity is in the range of 1 mm to 6 mm.

In some aspects, in the addition or in the alternative, at least one of the one or more code openings is defined by at least one tapered surface extending from the first surface to the cavity interior surface. In some implementations, the at least one of the one or more code openings tapers from a smallest cross-sectional area adjacent the first surface to a largest cross-sectional area adjacent the interior cavity surface. In some implementations, the smallest cross-sectional area and the largest cross-sectional area are measured in planes that are parallel to the first surface.

In some aspects, in the addition or in the alternative, the device further includes one or more supports extending from the cavity interior surface toward the second surface. In some implementations, at least one of the one or more supports defines at least one tapered surface. In some implementations, the at least one of the one or more supports tapers from a largest cross-sectional area adjacent the cavity interior surface to a smallest cross-sectional area adjacent the second surface. In some implementations, the largest cross-sectional area and the smallest cross-sectional area are measured in planes that are parallel to the first surface.

In some aspects, in the addition or in the alternative, the body has a first side extending between the first surface and the second surface and a second side opposite and spaced apart from the first side, wherein the first side defines a side opening extending from the first side to the cavity. In some implementations, the side opening extends from the first side, through the cavity, to the second side.

In some aspects, in the addition or in the alternative, the body includes a polymer. In some implementations, the polymer includes a composite material. In some implementations, the polymer includes a fiber reinforced material. In some implementations, the body includes a ceramic. In some implementations, the body includes a metal.

BRIEF DESCRIPTION OF THE DRAWINGS

FIG. 3 is a cross-sectional view of the three-dimensional coded card of FIG. 1 along line D-D.

FIG. 4 is a cross-sectional view of the three-dimensional coded card of FIG. 1 along line E-E.

FIG. 5 is a cross-sectional view of the three-dimensional coded card of FIG. 1 along line F-F.

FIG. 9 is a cross-sectional view of the three-dimensional coded card of FIG. 1 along line O-O.

FIG. 10 is a cross-sectional view of the three-dimensional coded card of FIG. 1 along line P-P.

FIG. 11 is a cross-sectional view of the three-dimensional coded card of FIG. 1 along line Q-Q.

FIG. 18 is a cross-sectional view of the three-dimensional coded card of FIG. 16 along line R-R.

FIG. 19 is a cross-sectional view of the three-dimensional coded card of FIG. 16 along line S-S.

FIG. 22 is a cross-sectional view of the three-dimensional coded card of FIG. 16 along line V-V.

FIG. 23 is a side view of a three-dimensional coded card, according to another implementation.

FIG. 24 is a side view of a three-dimensional coded card, according to another implementation.

DETAILED DESCRIPTION

Figure 1:
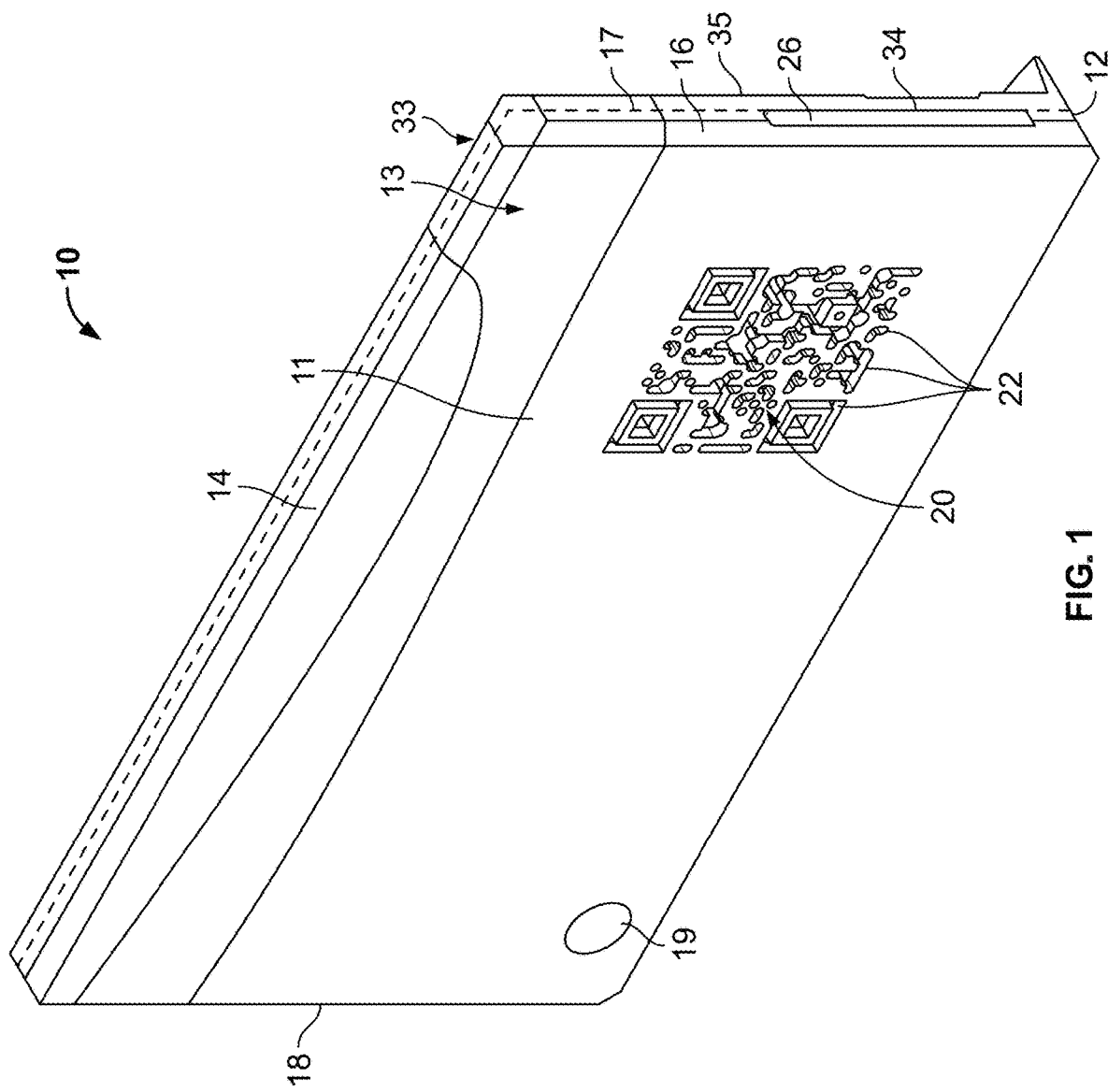
FIG. 1 is an isometric view of a three-dimensional coded card, according to one implementation.

The devices, systems, and methods disclosed herein provide for uniformly colored parts that have patterns that can be scanned for information. For example, the parts and/or the patterns may be produced by additive manufacturing. The patterns may include quick response (QR) codes, text, bar codes or any other type of digitally readable code. In some implementations, the pattern includes readable information relating to identification of the part (or device) itself. The readable additive manufactured parts include a pattern of surface portions defining openings, at least one cavity beneath the pattern of surface portions and openings, and supports connecting at least a portion of the surface portions to a back of the cavity. The cavity creates a black body effect by forming a larger volume beneath the openings of the surface pattern. The underlying volume greatly increases the amount of light that is absorbed and/or reflected internally after it passes through the surface pattern, thereby increasing contrast and digital readability.

The features work together to create a pattern that can be easily scannable by a phone or other imaging device (reader) and do not severely decrease the integrity of the part. The surface pattern formed by the additive manufactured material forming the front surface of the coded card may be imaged (scanned) by the phone or other imaging device. While the openings through the front surface provide lower light sections, the patterned openings may not be dark enough for an ordinary scanner as is. Therefore, steps are taken to make these openings darker. The cavity beneath the surface creates a black body, which functions by decreasing light radiation or reflection back out through the pattern openings. Light enters the surface openings and then bounces around the cavity to reduce the amount of light that exits the holes. Light is absorbed into the walls of the cavity at each reflection, therefore decreasing the amount of light exiting the hole.

The supports extend between portions of the pattern connecting the portions to the back of the cavity. 5 These supports maintain some of the surface structural integrity of the part in the region of the surface pattern, preventing bending at thin sections as well as supporting floating islands that might appear due to the combination of the pattern cuts and the cavity behind the pattern.

The devices, systems, and methods disclosed herein provide for incorporation of scannable patterns into parts during additive manufacturing. Additionally, three-dimensional patterns can be placed on much thinner surfaces over what is known. The cavity does need not to have a specific geometry. Therefore, for example, a cavity that is shallow but long and wide has a similar result to a slice that is deep and the same size as the pattern. These options allow for higher flexibility when designing parts with a scannable pattern.

Various implementations include an optically readable coded device. The device includes a body having a first surface and a second surface opposite and spaced apart from the first surface, wherein the second surface defines a cavity. The cavity has a cavity interior surface spaced apart from the second surface. The first surface defines one or more code openings extending from the first surface to the cavity interior surface and in fluid communication with the cavity. The cavity has a cavity cross-sectional area in a plane parallel to the first surface, and the code openings have a code opening total cross-sectional area at the intersection of each code opening and the cavity interior surface. The cavity cross-sectional area is larger than the code opening total cross-sectional area. The code openings define an optically readable code on the first surface.

For example, the optically readable coded device may include a card device. FIGS. 1-15 illustrate an example three-dimensional coded card device 10. The three-dimensional coded card device 10 includes a first body portion 13 and a second body portion 33. The first body portion 13 includes a first surface 11, a second surface 17 opposite and spaced apart from the first surface 11, a bottom edge 12, a top edge 14, a first side 16, and a second side 18. The device 10 also includes a second body portion 33 having a first surface 34 and a second surface 35. A through hole 19 is provided through the front surface 11 of the first body portion 13 to the second surface 35 of the second body portion 33 of the coded card device 10.

As shown in the side sectional views of FIGS. 3-11, a cavity 30 is defined by the second surface 17 of the first body portion 13. The cavity 30 has a cavity interior surface 32 spaced apart from the second surface 17 of the first body portion 13.

Figure 2:
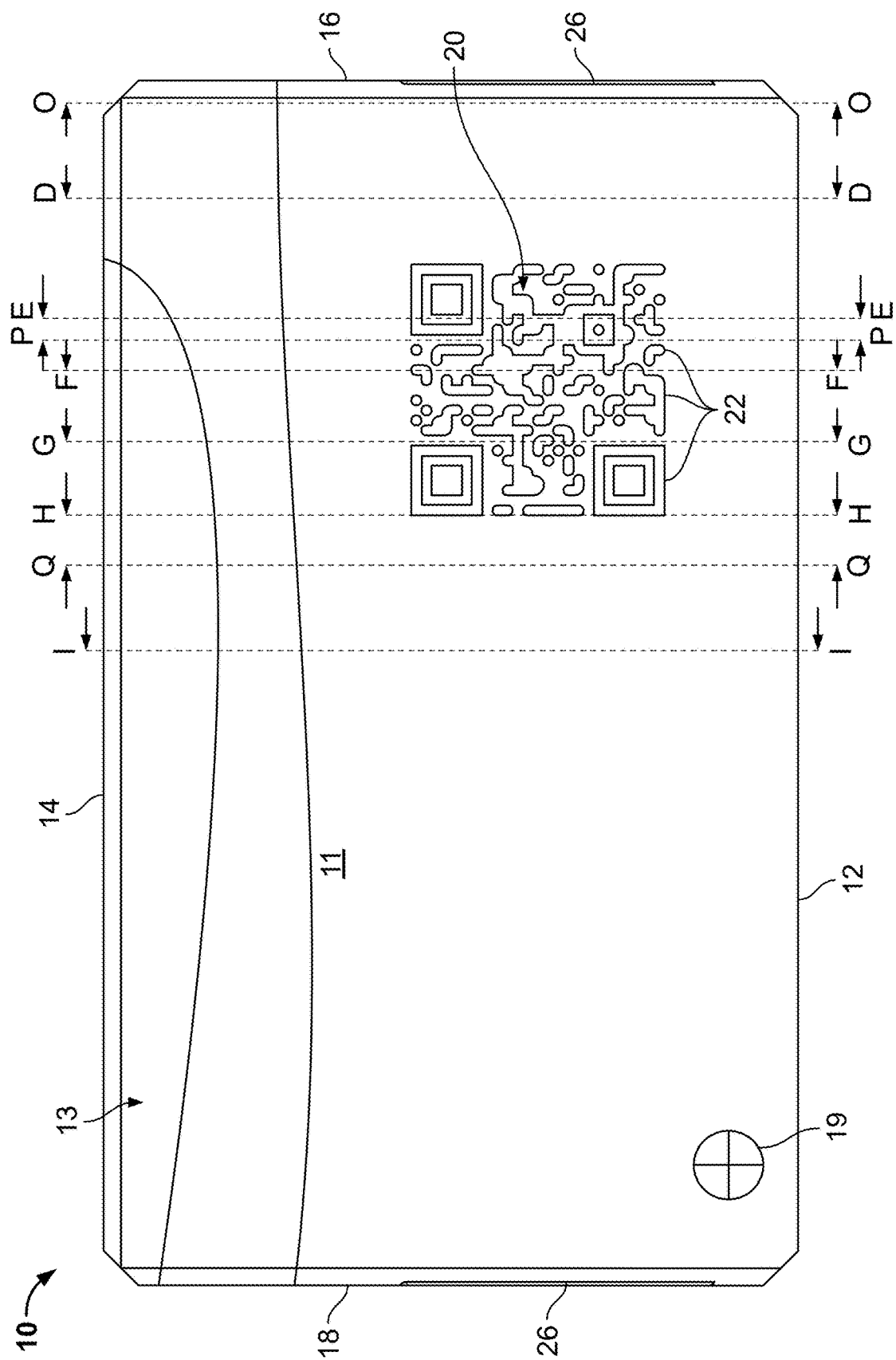
FIG. 2 is a front view of the three-dimensional coded card of FIG. 1.
Figure 6:
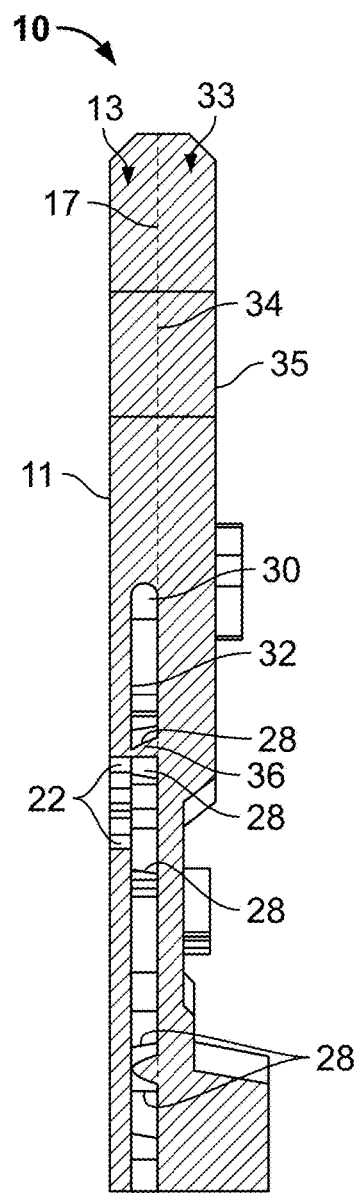
FIG. 6 is a cross-sectional view of the three-dimensional coded card of FIG. 1 along line G-G.
Figure 7:
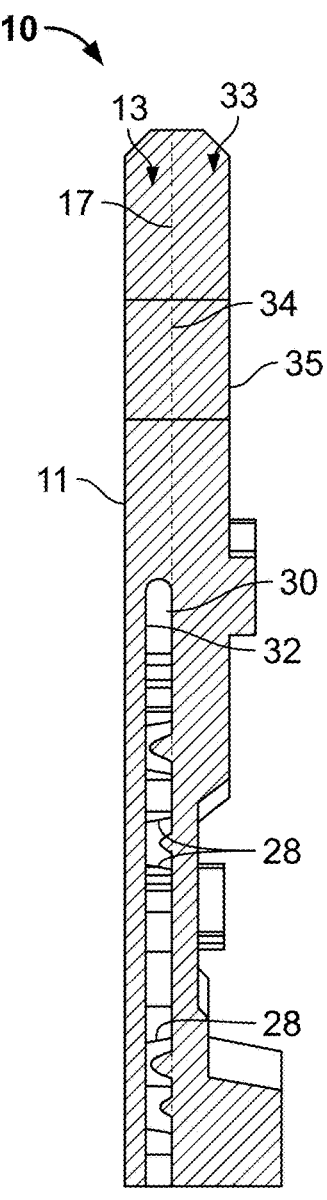
FIG. 7 is a cross-sectional view of the three-dimensional coded card of FIG. 1 along line H-H.
Figure 8:
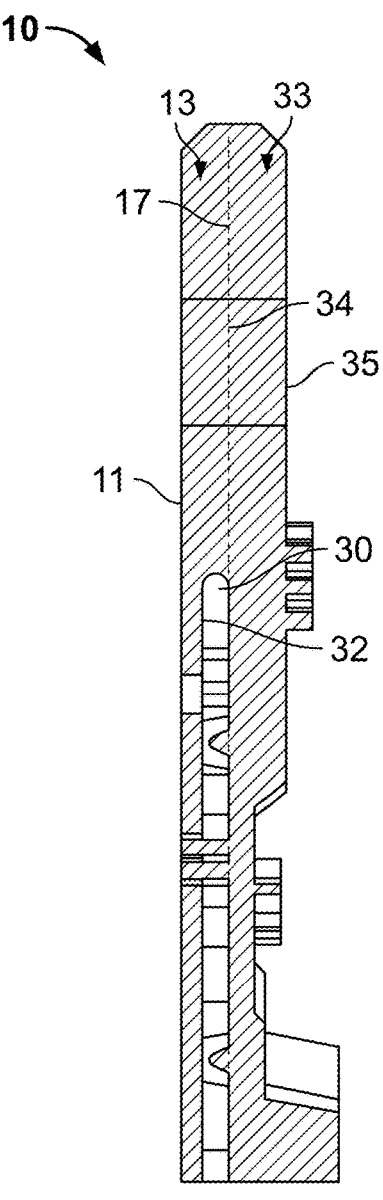
FIG. 8 is a cross-sectional view of the three-dimensional coded card of FIG. 1 along line I-I.
Figure 12:
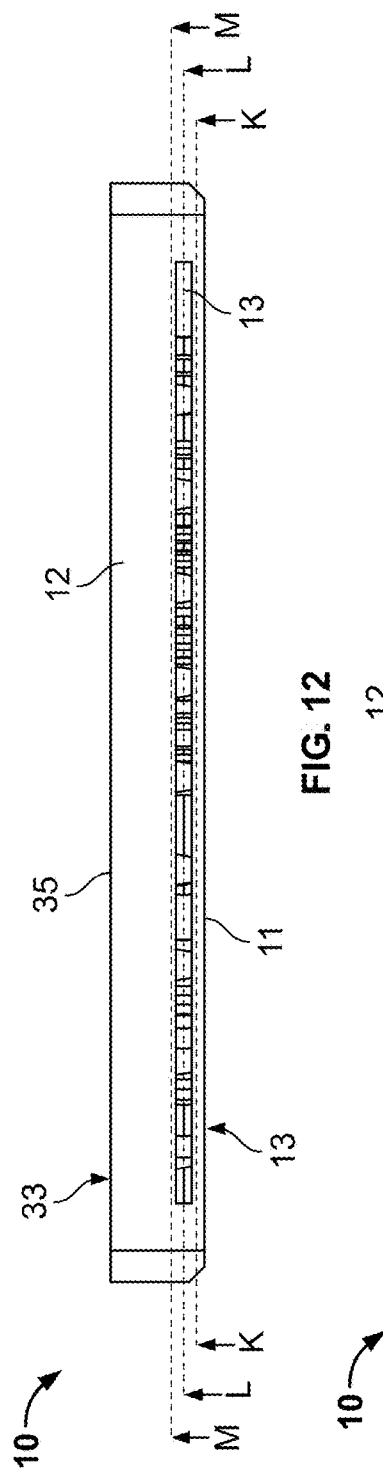
FIG. 12 is a bottom view of the three-dimensional coded card of FIG. 1.
Figure 13:
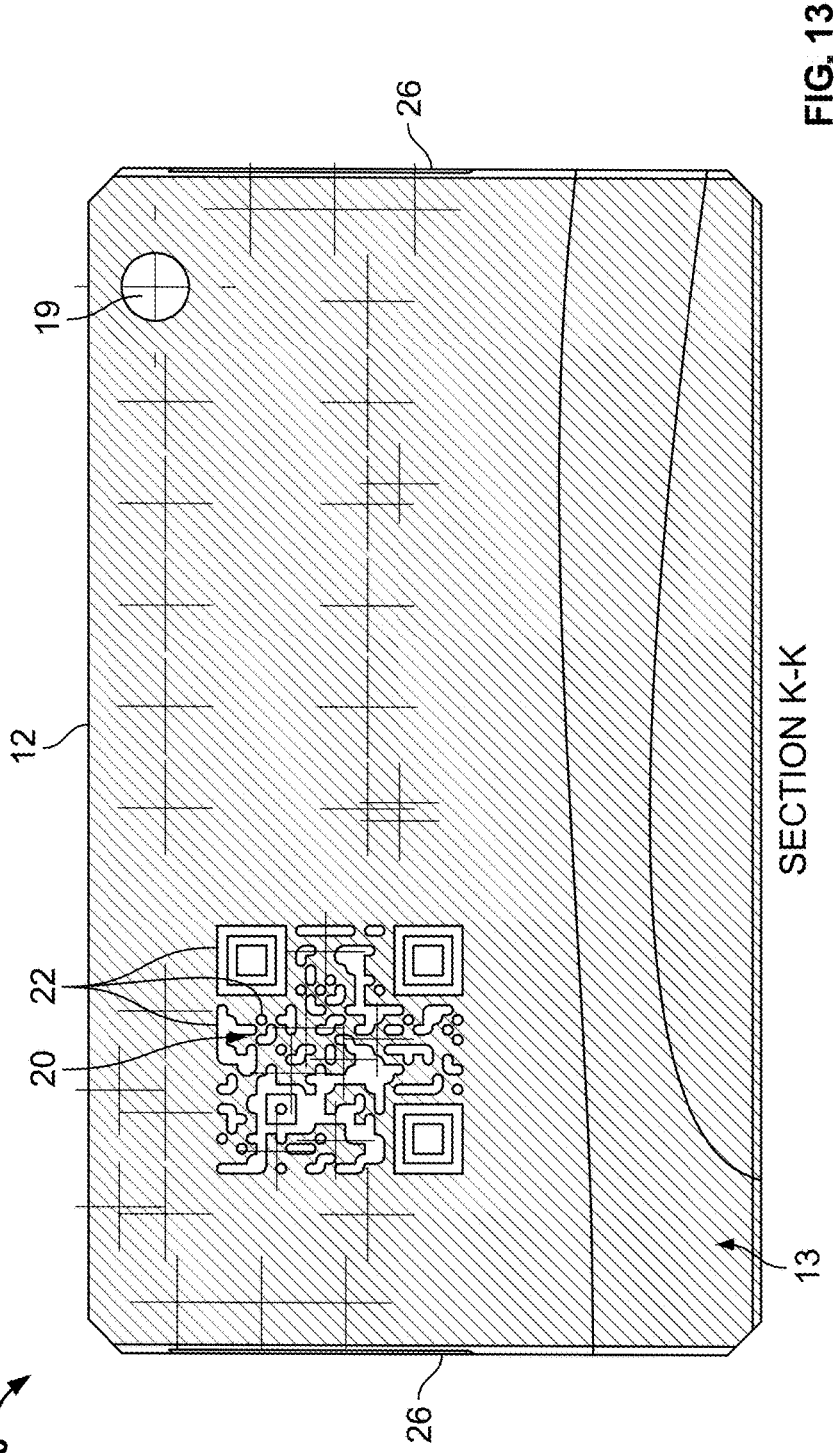
FIG. 13 is a cross-sectional view of the three-dimensional coded card of FIG. 1 along line K-K.
Figure 14:
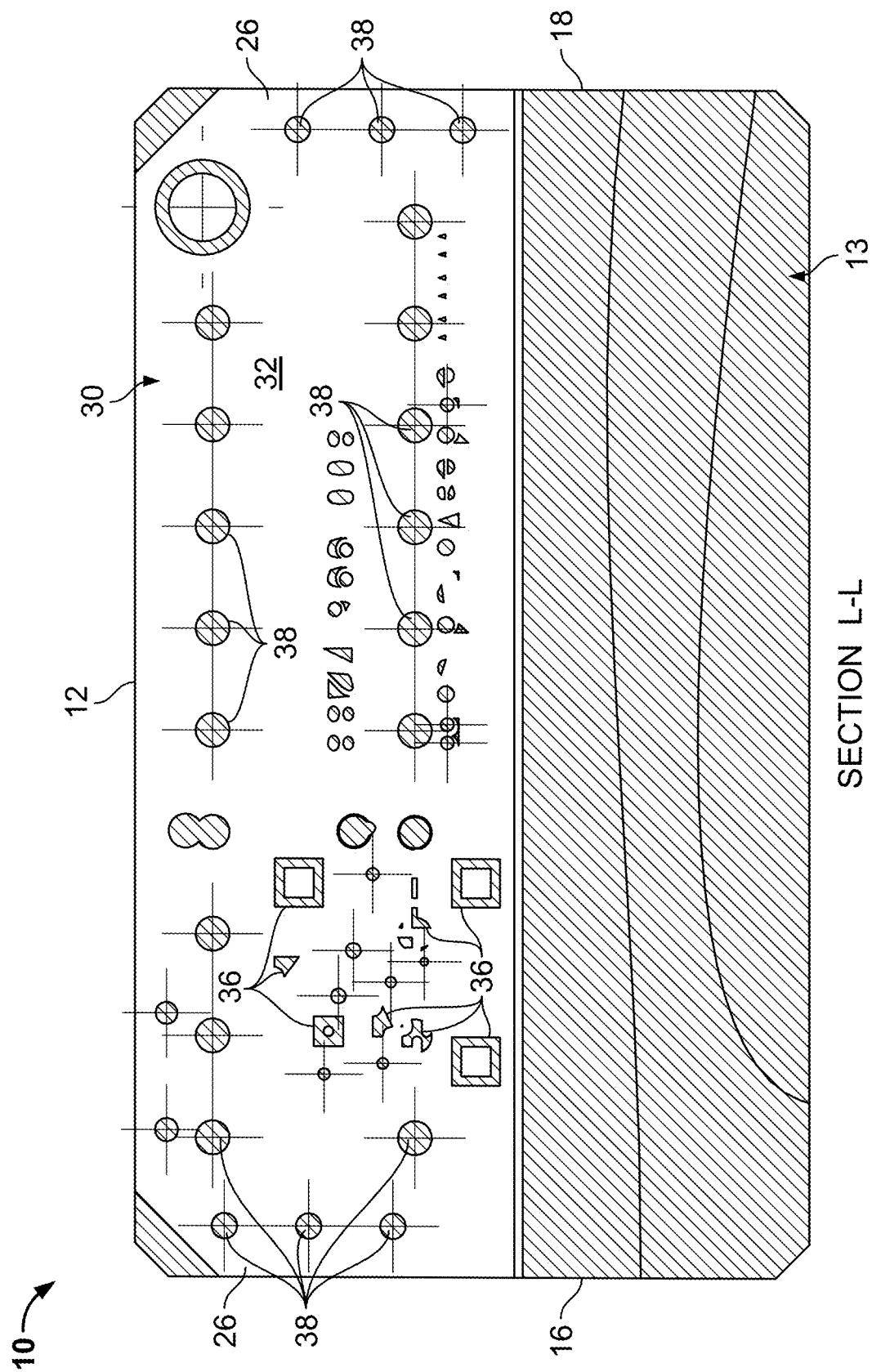
FIG. 14 is a cross-sectional view of the three-dimensional coded card of FIG. 1 along line L-L.
Figure 15:
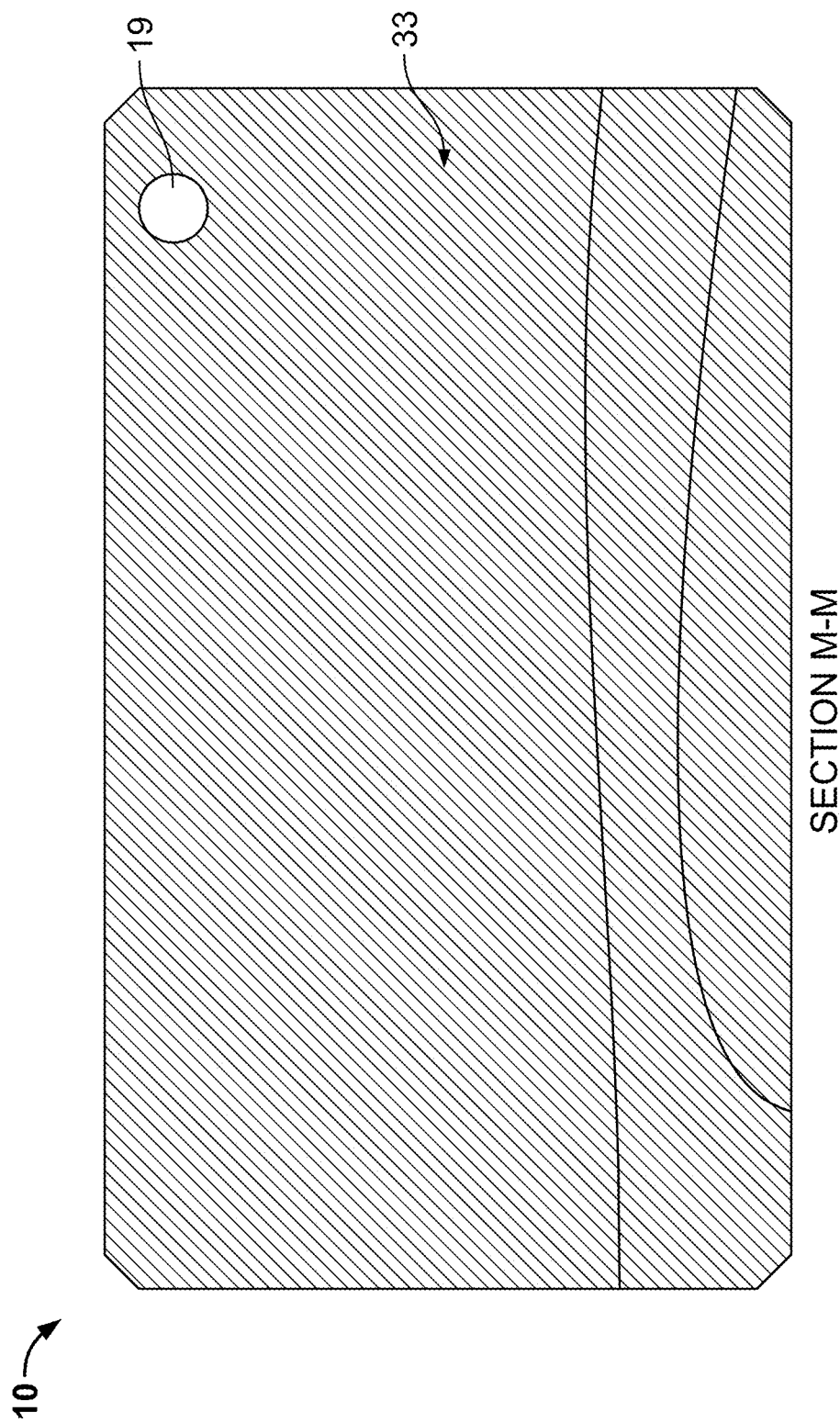
FIG. 15 is a cross-sectional view of the three-dimensional coded card of FIG. 1 along line M-M.

As shown most clearly in FIGS. 1 and 2, the first surface 11 of the first body portion 13 of the three-dimensional coded card device 10 includes a 3D surface pattern 20 having surface portions that define one or more code openings 22, and the surface portions and code openings 22 provide an optically readable code on the first surface 11. The one or more code openings 22 extend from the first surface 11 of the first body portion 13 to the cavity interior surface 32 and in fluid communication with the cavity 30.

The cavity 30 has a cavity cross-sectional area in a plane parallel to the first surface 11 of the first body portion 13, and the code openings 22 have a code opening total cross-sectional area at the intersection of each code opening 22 and the cavity interior surface 32. The cavity cross-sectional area is larger than the code opening total cross-sectional area. Because the cavity 30 is larger in cross-section than the total cross-section of the code openings 22, the light that enters the code openings 22 is able to pass into the larger space inside the cavity 30 rather than reflecting directly out of the code openings 22. When the light enters the relatively larger cavity 30, at least a portion of the light reflects within the cavity 30 and is further absorbed or attenuated. Thus, for situations where the first body portion 13 and the second body portion 33 include a single color, or very similar colors, the light that reflects out of the code openings 22 is a lesser intensity than the light that reflects off of the first surface 11 of the first body portion 13, creating a lighting contrast between the light reflecting off of the first surface 11 of the first body portion 13 and the light reflecting out of the code openings 22. This contrast in light intensity is optically detectable, and thus, optically readable on the first surface 11 of the first body portion 13.

The depth of the cavity 30 in FIGS. 1-15, as measured between the cavity interior surface 32 to the second surface 17 of the first body portion 13, is 5 mm. However, in some implementations, the depth of the cavity is in the range of 1 mm to 6 mm. In some implementations, the depth of the cavity is 0.5 mm or greater, such as 1.0 mm, 1.5 mm, 2.0 mm, 2.5 mm, 3.0 mm, 3.5 mm, 4.0 mm, 4.5 mm, 5.0 mm, 5.5 mm, 6.0 mm, 6.5 mm, 7.0 mm, 7.5 mm, 8.0 mm, 8.5 mm, 9.0 mm, 9.5 mm, 10.0 mm, 10.5 mm, 11.0 mm, 11.5 mm, 12.0 mm, 12.5 mm, 13.0 mm, 13.5 mm, 14.0 mm, 14.5 mm, 15.0 mm, or more. In some implementations, the depth of the cavity is determined as a factor of the total cross-sectional area of the code openings, the widths of the code openings, the number, sizes, and shapes of the supports and posts, the cross-sectional area of the cavity, and other openings in the cavity.

The first body portion 13 and the second body portion 33 of the device 10 shown in FIGS. 1-15 are monolithically formed, meaning the portions 13, 33 are integrally formed or formed as a single piece. The device 210 shown in FIG. 23 is similar to the devices shown in FIGS. 1-22 and can include any of the features discussed herein. However, the first body portion 213 and the second body portion 233 of the device shown in FIG. 23 are separately formed, and the second surface 217 of the first body portion 213 and the first surface 234 of the second body portion 233 are coupled together post-forming. In some implementations, the first body portion can be coupled to the second body portion by adhesive, magnets, fasteners, welding, fusing, or any other temporary or permanent coupling means known in the art. For example, in some implementations, an adhesive layer is disposed on at least a portion of the second surface. In some implementations, an adhesive layer is disposed on at least a portion of the second surface.

The device 310 shown in FIG. 24 is similar to the devices shown in FIGS. 1-23 and can include any of the features discussed herein. However, the device 310 only includes a single body portion 313. In such implementations, the cavity 330 is open along the second surface 317. The second surface 317 is couplable to a separate surface such that at least a portion of the separate surface partially forms the cavity 330. An adhesive layer can be disposed on at least a portion of the second surface 317 to couple the body 313 to the separate surface. In some implementations, the second surface is couplable to a separate surface by any other coupling feature discussed above with respect to the device 210 of FIG. 23.

Multiple supports 36 and posts 38 are provided inside the cavity 30. As shown in the front sectional views of FIGS. 13 and 14, as well as the side sectional views of FIGS. 3-8, 10, and 11, the supports 36 extend from the cavity interior surface 32 to the first surface 34 of the second body portion 33 to provide structural integrity to the first surface 11 of the first body portion 13 in the region of the 3D surface pattern 20. In addition to the supports 36 in the region of the 3D surface pattern 20, additional posts 38 extend from the cavity interior surface 32 to the first surface 34 of the second body portion 33 to provide additional structural integrity for the first surface 11 of the first body portion 13 of the coded card device 10.

As shown in the side sectional views of FIGS. 3-8, 10, and 11, at least one of the supports 36 defines at least one tapered surface. The at least one of the supports 36 tapers from a largest cross-sectional area adjacent the cavity interior surface 32 to a smallest cross-sectional area adjacent the second surface 17 of the first body portion 13. The largest cross-sectional area and the smallest cross-sectional area are measured in planes that are parallel to the first surface 11 of the first body portion 13. The supports 36 may be tapered at straight angles, as shown in the figures, or may be tapered with curved sides such as concave or convex. Alternatively, the supports may include one or more stepped portions.

As shown in the side sectional views of FIGS. 3-8, 10, and 11, at least a portion of the code openings 22 are provided with undercuts 28 inside the cavity 30, which allow for increased light attenuation or controlled reflectance in order to reduce light reflections from the interior of the cavity 30 that could otherwise escape back through the code openings 22. The undercuts 28, as well as the overall volume of the cavity 30, act to trap light, and other types of electromagnetic radiation, such as infrared and ultraviolet wavelengths, to thereby provide a black body effect that facilitates reading of the 3D surface pattern 20.

The undercuts 28 provided in the cavity 30 may have any suitable shapes and sizes. For example, one or more of the code openings 22 shown in FIGS. 3-8, 10, and 11 is defined by at least one tapered surface extending from the first surface 11 of the first body portion 13 to the cavity interior surface 32. The one or more code openings 22 taper from a smallest cross-sectional area adjacent the first surface 11 of the first body portion 13 to a largest cross-sectional area adjacent the interior cavity surface 32. The smallest cross-sectional area and the largest cross-sectional area are measured in planes that are parallel to the first surface 11 of the first body portion 13. The undercuts 28 may be tapered at straight angles, as shown in the figures, or may be tapered with curved sides such as concave or convex. Alternatively, the undercuts may include one or more stepped portions.

A side opening 26 is defined by the first side 16 of the first body portion 13 of the coded card device 10. In the embodiment shown, the side opening 26 extends through the entire width of the first body portion 13 of the coded card device 10 from the first side 16, through the cavity 30, to the second side 18. However, the side opening 26 may alternatively extend only from the first side 16 to the cavity 30 of the coded card device 10.

Figure 16:
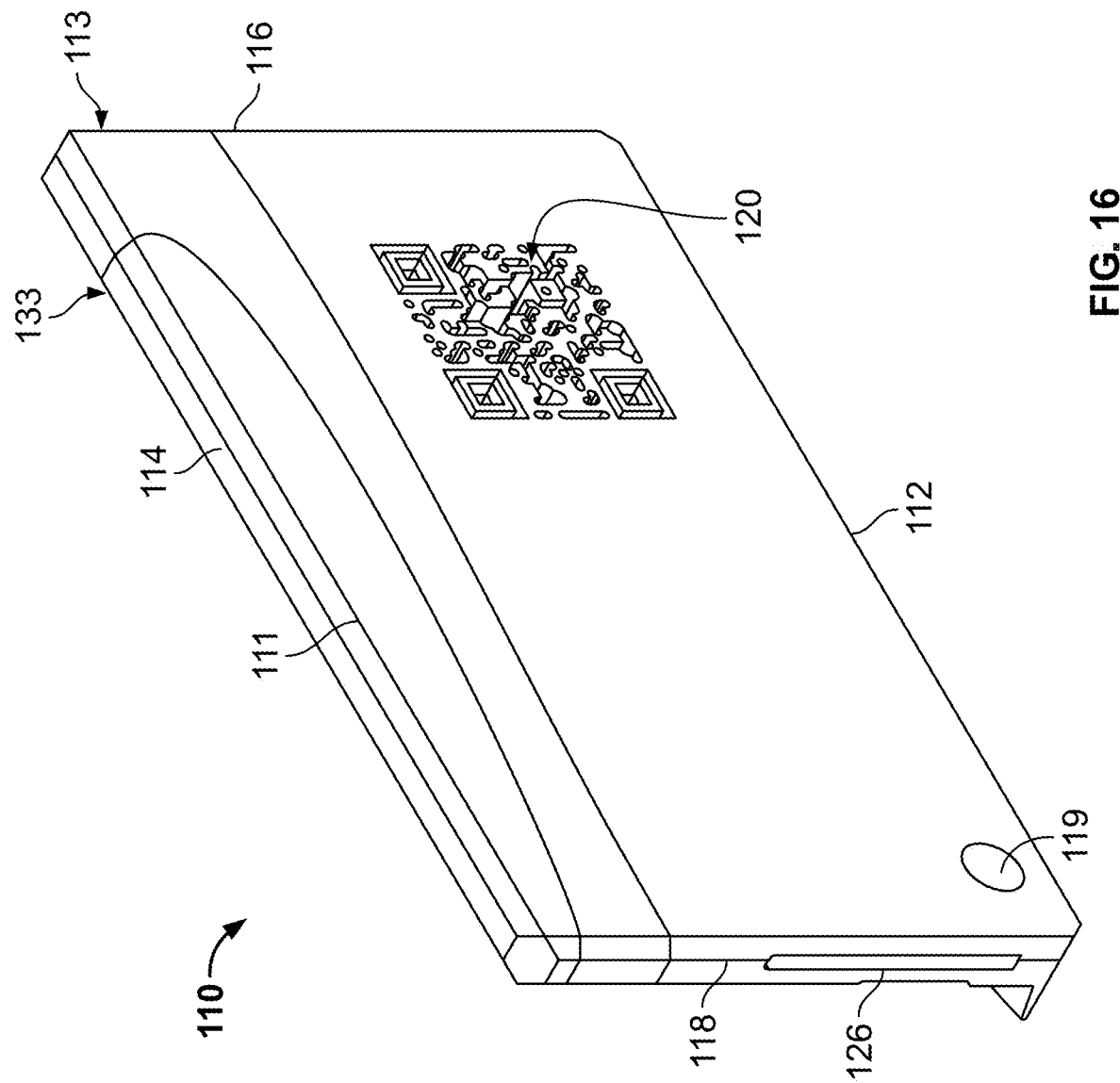
FIG. 16 is an isometric view of a three-dimensional coded card, according to another implementation.
Figure 17:
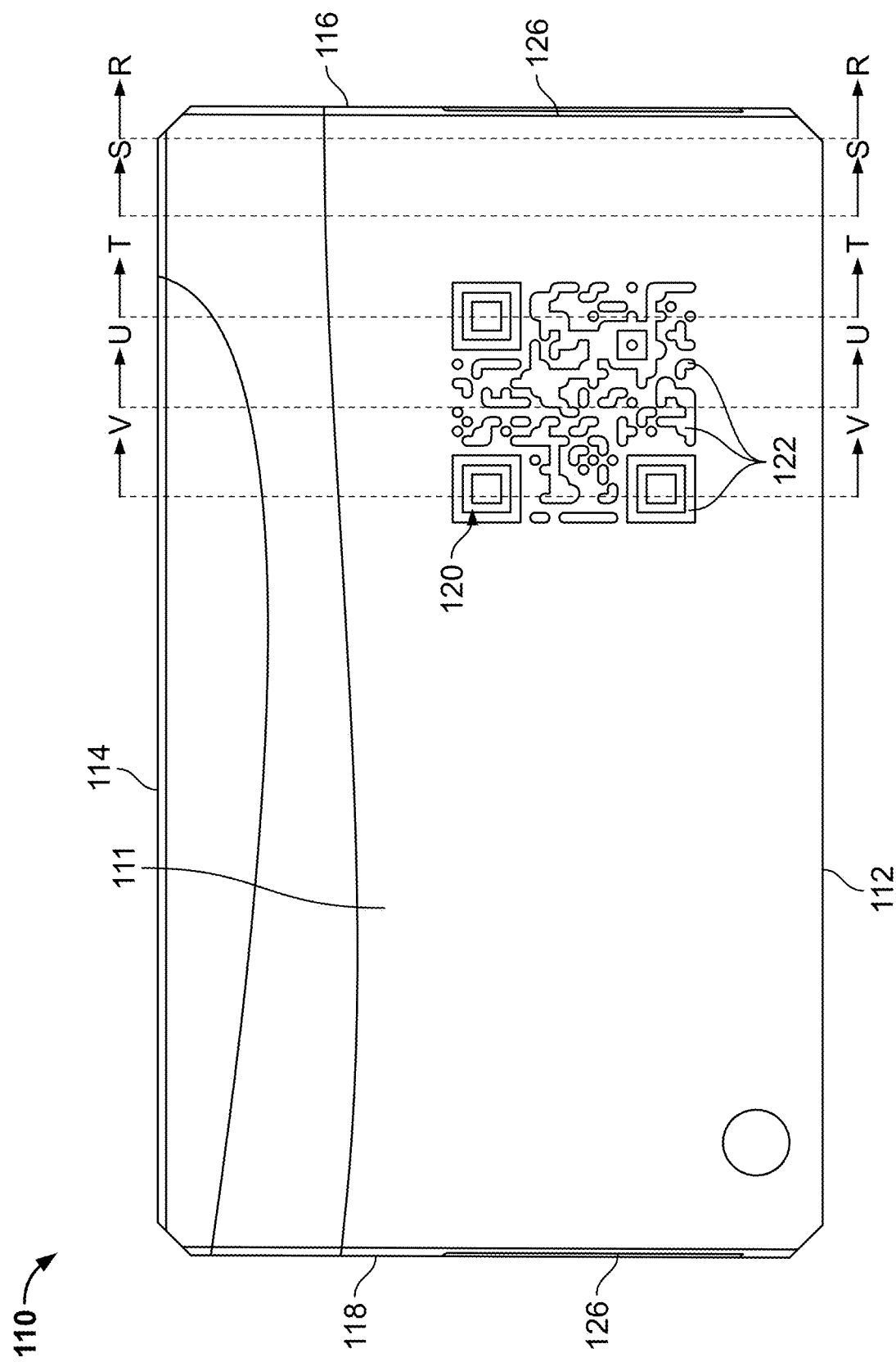
FIG. 17 is a front view of the three-dimensional coded card of FIG. 16.
Figure 20:
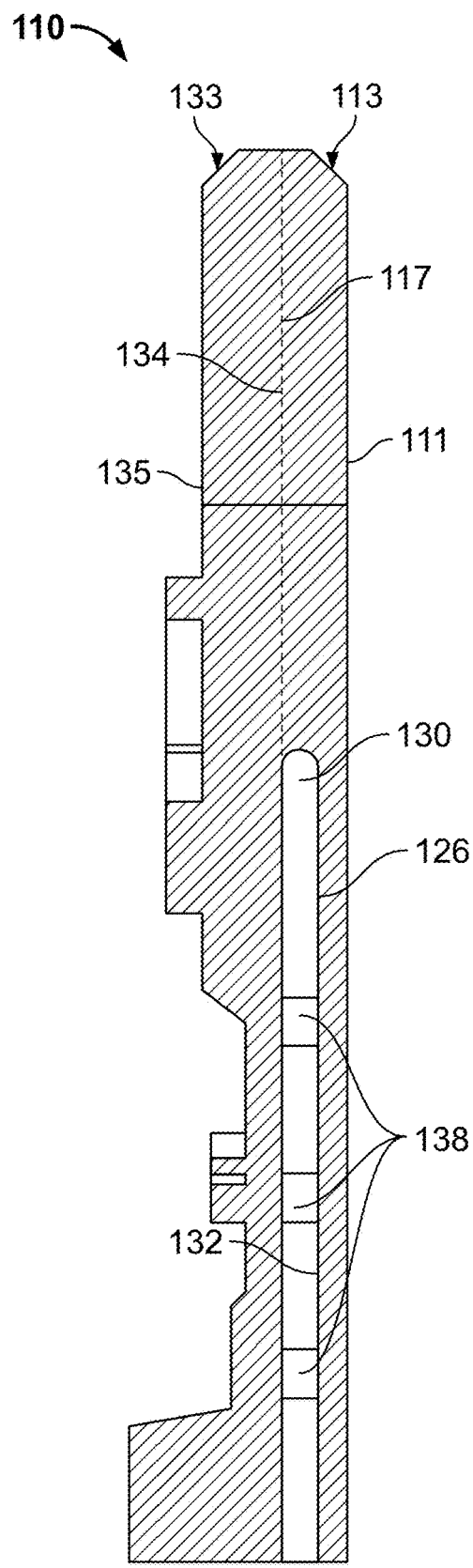
FIG. 20 is a cross-sectional view of the three-dimensional coded card of FIG. 16 along line T-T.
Figure 21:
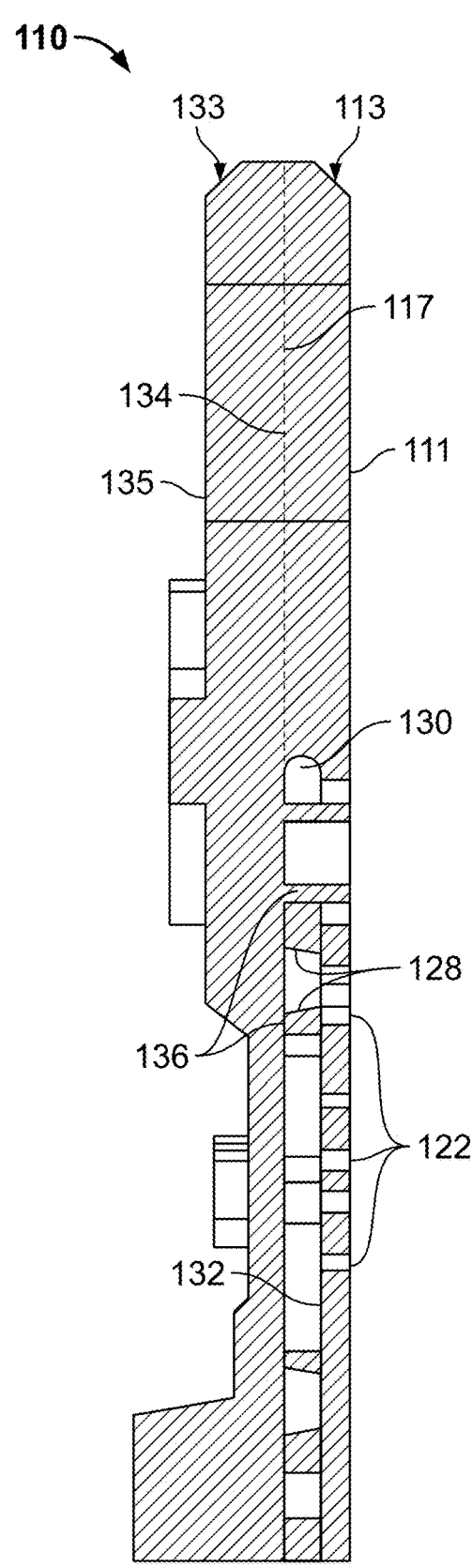
FIG. 21 is a cross-sectional view of the three-dimensional coded card of FIG. 16 along line U-U.

As shown in the embodiment of FIGS. 16-22, the three-dimensional coded card device 110 includes similar features as the three-dimensional coded card device 10 shown in FIGS. 1-15. The coded card device 110 includes a first body portion 113 and a second body portion 133. The first body portion 113 includes a first surface 111, a second surface 117 opposite and spaced apart from the first surface 111, a bottom edge 112, a top edge 114, a first side 116, and a second side 118. The second body portion 133 has a first surface 134 and a second surface 135 opposite and spaced apart from the first surface 134 of the second body portion 133. As shown in FIGS. 16 and 17, the coded card device 110 includes a 3D surface pattern 120 defined by code openings 122 that are defined by the first surface 111 of the first body portion 113. As shown in the side sectional views of FIGS. 18-22, a side opening 126 and cavity 130 are defined by the first body portion 113. The cavity 130 has a cavity interior surface 132 spaced apart from the second surface 117 of the first body portion 113. Supports 136 are provided inside the cavity 130 in the region of the 3D surface pattern 120, and posts 138 are also provided in the cavity 130.

Additive manufactured substrates of the present invention such as the coded card devices 10, 110, 210, 310 described above may be made from any suitable types of materials capable of being additive manufactured and scanned when configured as described herein. For example, substrates may be made of UV and thermal cured polymers, composite materials, carbon-containing materials such as carbon fiber reinforced ABS carbon particle containing resins, ceramic materials such as alumina, zirconia and HAP, metals such as stainless steels, aluminum, titanium and copper, and any other suitable materials.

The additive manufacturing process used to make the 3D readable substrates of the present invention may include any suitable process such as vat photopolymerization, material jetting, directed energy deposition, material extrusion, binder jetting, sheet lamination, powder bed fusion, and the like.

Vat photopolymerization is an additive manufacturing process in which liquid photopolymer in a vat is selectively cured by light-activated polymerization. The curing device may be a laser, ultraviolet light, digital screen, LCD screen, and/or the like. The curing device may be located above or below the vat. The object may be manufactured from the top-down or from the bottom-up. The curing device may focus a concentrated beam onto the surface of the vat by cross-linking or degrading a polymer layer-by-layer. The curing device may use a digital projector screen to flash a single image at each layer across the entire platform, exposing an entire layer at once. The curing device may illuminate the vat through a transparent bottom, allowing the object to rise layer by layer. This process repeats until the part is completed.

When vat photopolymerization is used to produce 3D readable substrates of the present invention, the shape that is created by vat photopolymerization may go through post processing steps to clean it, such as centrifugal force, solvent exposure, and swabbing. The part may then go through a final thermal curing stage.

Material jetting is an additive manufacturing process in which droplets of feedstock material are selectively deposited. The feedstock material may be metal, ceramic, photosensitive material, and/or the like. The feedstock material may be deposited layer by layer. Once deposited, the feedstock material may be cured, such as by using an ultraviolet light or heat. The feedstock material may be deposited in liquid form ultra-thin layers and immediately cured. The feedstock material may include solid particles suspended in liquid. The feedstock material may be deposited continuously or on demand. This process repeats until the part is completed.

Directed energy deposition is an additive manufacturing process in which focused thermal energy is used to fuse materials by melting as they are being deposited. A nozzle mounted on a multi-axis arm (e.g., 3, 4, or 5 axes) deposits a material on a base or a component. The material may be a metal, polymer, ceramic, and/or the like. The material may be in the form of a wire, powder, and/or the like. As the material is deposited, the material is melted by a source of focused thermal energy (e.g., an electron beam, a laser, and/or the like). This process continues repeatedly until the layers have solidified.

Material extrusion is an additive manufacturing process in which material is selectively dispensed through a nozzle or orifice. The nozzle is heated such that as the material is being extruded through the nozzle, the material is melted. The material may be a metal, polymer, ceramic, and/or the like. The material may be in filament form, such that the filament is fed to the nozzle from a coil of material. The melted material is deposited layer by layer. The nozzle may move along the x and y axes. The platform in which the material is deposited may move along the z axis between each layer. This process repeats until the part is completed.

Binder jetting is an additive manufacturing process in which a liquid bonding agent is selectively deposited to join powder materials. The powder material (e.g., a metal, gypsum, polymers, sand, ceramics, and/or the like in granular or powder form) may be spread in a thin layer on a printing plate. Droplets of binder (e.g., the liquid bonding agent with or without added color) may be strategically deposited into the powder bed to bond the powder at the location of the droplets. After a layer is completed, the printing plate may be dropped and another layer of powder material is spread across the printing plate. This process repeats until the part is completed. The part may undergo post-processing steps, such as curing, sintering, infiltration, polishing, plating, and/or the like.

Sheet lamination is an additive manufacturing process in which sheets of material are bonded to form a part. The sheets may be made of metal, paper, plastics, and/or the like. A sheet is placed on the build platform. The sheet is cut using a laser or knife. Each layer is joined to the preceding layer by wielding or apply an adhesive. This process repeats until the part is completed.

Powder bed fusion is an additive manufacturing process in which thermal energy selectively fuses regions of a powder bed. A thin layer of powder material is spread on a build platform. The powder material may be a metal, rubber, gypsum, polymers, sand, ceramics, and/or the like. A heat source, such as a laser, electron beam, and/or the like, may be used to fuse the powder particles together layer-by-layer. After a layer is completed, the build platform may be dropped and another layer of powder material is spread across the printing plate. This process repeats until the part is completed.

As used herein, "including," "containing" and like terms are understood in the context of this application to be synonymous with "comprising" and are therefore open-ended and do not exclude the presence of additional undescribed or unrecited elements, materials, phases or method steps. As used herein, "consisting of" is understood in the context of this application to exclude the presence of any unspecified element, material, phase or method step. As used herein, "consisting essentially of" is understood in the context of this application to include the specified elements, materials, phases, or method steps, where applicable, and to also include any unspecified elements, materials, phases, or method steps that do not materially affect the basic or novel characteristics of the invention.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. In this application and the appended claims, the articles "a," "an," and "the" include plural referents unless expressly and unequivocally limited to one referent.

Whereas particular embodiments of this invention have been described above for purposes of illustration, it will be evident to those skilled in the art that numerous variations of the details of the present invention may be made without departing from the invention.

What is claimed is:

1. An optically readable coded device, the device comprising:
    a body having a first surface and a second surface opposite and spaced apart from the first surface, wherein the second surface defines a cavity, wherein the cavity has a cavity interior surface spaced apart from the second surface, wherein the first surface defines one or more code openings extending from the first surface to the cavity interior surface and in fluid communication with the cavity,
    wherein the cavity has a cavity cross-sectional area in a plane parallel to the first surface, and the code openings have a code opening total cross-sectional area at the intersection of each code opening and the cavity interior surface, wherein the cavity cross-sectional area is larger than the code opening total cross-sectional area, and
    wherein the code openings define an optically readable code on the first surface.

2. The device of claim 1, further comprising an adhesive layer disposed on at least a portion of the second surface.

3. The device of claim 1, wherein the body is a first body portion, the device further comprising a second body portion having a first surface and a second surface opposite and spaced apart from the first surface, wherein the second surface of the first body portion is coupled to the first surface of the second body portion such that the first surface of the second body portion partially defines the cavity.

4. The device of claim 3, wherein the first body portion and the second body portion are monolithically formed.

5. The device of claim 3, further comprising an adhesive layer disposed on at least a portion of the first surface of the second body portion.

6. The device of claim 3, wherein the first surface of the second body portion is the same color as the first surface of the first body portion.

7. The device of claim 1, wherein the readable code comprises a quick response (QR) code.

8. The device of claim 1, wherein the readable code comprises a bar code.

9. The device of claim 1, wherein the readable code comprises readable information relating to identification of the device.

10. The device of claim 1, wherein the depth of the cavity, as measured between the cavity interior surface to the second surface, is in the range of 1 mm to 6 mm.

11. The device of claim 1, wherein at least one of the one or more code openings is defined by at least one tapered surface extending from the first surface to the cavity interior surface, wherein the at least one of the one or more code openings tapers from a smallest cross-sectional area adjacent the first surface to a largest cross-sectional area adjacent the interior cavity surface, wherein the smallest cross-sectional area and the largest cross-sectional area are measured in planes that are parallel to the first surface.

12. The device of claim 1, further comprising one or more supports extending from the cavity interior surface toward the second surface.

13. The device of claim 12, wherein at least one of the one or more supports defines at least one tapered surface, wherein the at least one of the one or more supports tapers from a largest cross-sectional area adjacent the cavity interior surface to a smallest cross-sectional area adjacent the second surface, wherein the largest cross-sectional area and the smallest cross-sectional area are measured in planes that are parallel to the first surface.

14. The device of claim 1, wherein the body has a first side extending between the first surface and the second surface and a second side opposite and spaced apart from the first side, wherein the first side defines a side opening extending from the first side to the cavity.

15. The device of claim 14, wherein the side opening extends from the first side, through the cavity, to the second side.

16. The device of claim 1, wherein the body comprises a polymer.

17. The device of claim 16, wherein the polymer comprises a composite material.

18. The device of claim 16, wherein the polymer comprises a fiber reinforced material.

19. The device of claim 1, wherein the body comprises a ceramic.

20. The device of claim 1, wherein the body comprises a metal.

* * * * *